United States Patent

[11] 3,607,666

[72] Inventor Paul S. Roller
 703 Colorado Bldg., 1341 G St. N.W.,
 Washington, D.C. 20005
[21] Appl. No. 868,293
[22] Filed Oct. 17, 1969
[45] Patented Sept. 21, 1971
 Continuation-in-part of application Ser. No.
 657,142, July 31, 1967, now abandoned.

[54] METHOD AND APPARATUS FOR SALINE WATER EVAPORATION
 12 Claims, 6 Drawing Figs.
[52] U.S. Cl...................................................... 203/7,
  203/10, 203/11
[51] Int. Cl....................................................... B01d 3/34,
  B01d 3/00
[50] Field of Search............................................ 203/7, 10,
  11; 252/175; 210/58; 159/DIG. 13, 2, 3

[56] References Cited
UNITED STATES PATENTS

| | | | |
|---|---|---|---|
| 3,119,752 | 1/1964 | Checkovich................... | 203/11 |
| 3,218,241 | 11/1965 | Checkovich................... | 203/11 X |
| 3,351,120 | 11/1967 | Goeldner et al.............. | 159/13 B |
| 3,388,045 | 6/1968 | Goeldner et al.............. | 203/11 X |
| 3,420,747 | 1/1969 | Williamson................... | 203/11 |

Primary Examiner—Norman Yudkoff
Assistant Examiner—J. Sofer

ABSTRACT: In order to prevent the formation of alkaline scale, chiefly calcium carbonate, in heating saline water before evaporation, carbon dioxide is combined with the deaerated, and, as required, chemically deoxygenated saline water, and retained during the heating. Carbon dioxide evolved after heating comprises that which had been added and that concurrently formed by bicarbonate decomposition. A portion of the evolved carbon dioxide is recirculated for combination with the saline water, while the excess is discharged or stored.

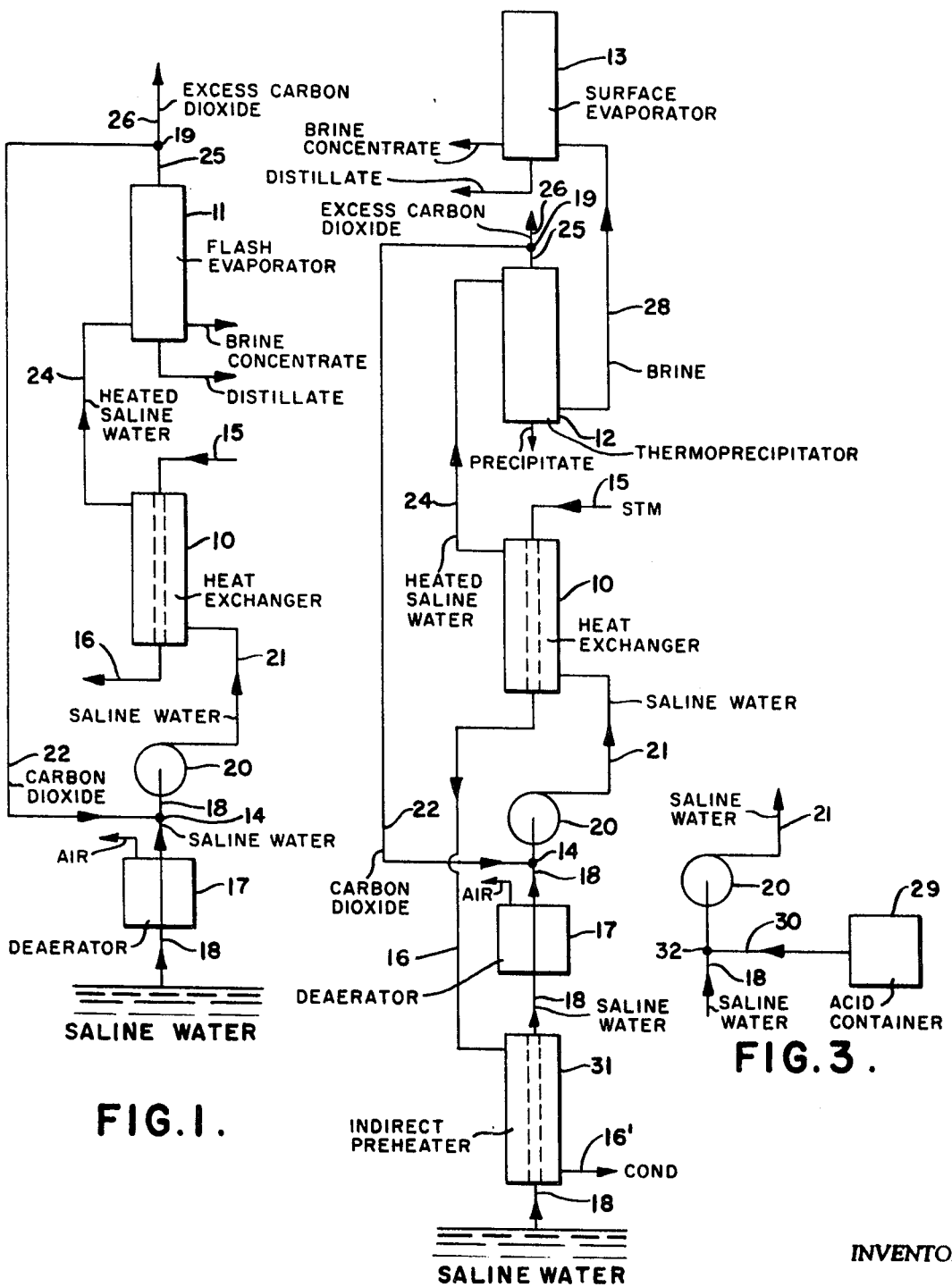

INVENTOR.
Paul S. Roller

METHOD AND APPARATUS FOR SALINE WATER EVAPORATION

This application is a continuation-in-part of my previous application, Ser. No. 657,142, now abandoned.

The invention relates to the preparation and conversion by evaporation of saline water to fresh water and brine, and in particular to the prevention of scale in heating saline water preparatory to its evaporation.

Saline water is characterized by the presence of sodium chloride and other mineral salts including that of bicarbonate and carbonate, and explicitly in regard to scale-formation in heating the alkaline compounds of calcium and magnesium bicarbonate and the compound calcium sulfate. It includes brackish, estuarine, ocean and sea waters. The latter is typical of the saline waters under consideration and reference will be made indifferently to sea and saline water.

Scale formation on the heat transfer surfaces of a sea water evaporator has consistently stood in the way of effective operation of the evaporator. In multistage flash evaporation, a solution to the scale problem is obtained by the omission of sea water heat transfer surfaces in the evaporator. Another solution to the problem is to thermally precipitate scale-forming compounds before evaporation, as is set forth, for example, in my copending application Ser. No. 834,203. In both methods, it is necessary to heat the sea water in a heat exchanger to a temperature related to the temperature of evaporation. If the heating temperature is high, as it invariably is for thermal efficiency, scale in the form generally of calcium carbonate is apt to form on the heat transfer surfaces of the heat exchanger.

In order to overcome heat exchanger surface scaling, it is common practice in the multistage flash evaporation of sea water to add to it sulfuric acid in an amount sufficient to interact with all of the bicarbonate and carbonate in the sea water and to evacuate the carbon dioxide before heating, as described for example, by Mulford, Glater and McCutchan in Proceedings First International Symposium on Water Desalination, Washington, D. C. Oct. 3–9, 1965, p. 148.

The present invention is based upon the concept that, instead of eliminating carbon dioxide from the sea water, it is kept dissolved therein, and applied as such to prevent scale formation in the heat exchanger. After the sea water has left the heat exchanger, the dissolved carbon dioxide is evolved, while alkaline scale compounds come out of solution. But this is made to occur as a body precipitate out of contact with heat exchange surfaces and therefore without harm. In the instance of multistage flash evaporation, the precipitate forms in the boiling brine and is carried along with it to exit. In the instance of thermoprecipitation wherein superior heat is applied, the precipitate forms in the body of the sea water and falls out as sludge while brine, comprising sea water separated from the precipitate, is formed.

It is an object of the invention to provide for scale-free heating of saline water preparatory to its evaporation by dissolving carbon dioxide in the saline water and retaining the carbon dioxide in solution during said heating.

Another object is to provide for recovery of the dissolved carbon dioxide and its combination with the saline water involving substantial or complete solution of the carbon dioxide in the saline water before said heating thereof.

Still another object is to provide for deaeration of the saline water prior to dissolving carbon dioxide therein.

A further object is to provide for the temporary formation of dissolved carbon dioxide in the saline water by adding an acidic substance to it.

A still further object is to provide for the elimination of oxygen and other oxidant residuals in the deaerated saline water before the heating thereof.

Another object is to provide for the recovery and storage of evolved carbon dioxide.

With these and other objects in mind, for a better understanding of the invention reference is made to the drawing, in which similar parts are similarly numbered, and in which:

FIG. 1 is a diagrammatic representation of a saline water evaporation apparatus including provision for heating the saline water in the presence of dissolved carbon dioxide, and recovering the carbon dioxide for combination with the saline water;

FIG. 2 is a diagrammatic representation of an apparatus alternate to that of FIG. 1;

FIG. 3 is a fragmentary diagram illustrating the employment of a strong acid as one means of temporarily producing dissolved carbon dioxide in the saline water;

Figure 6:
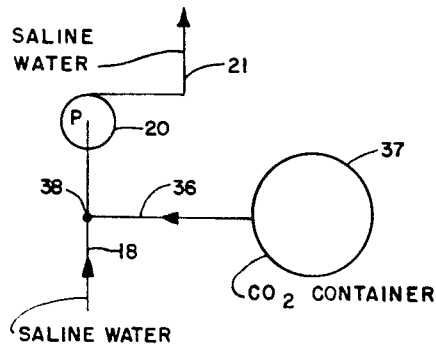
FIG. 6 is a fragmentary diagram illustrating the employment of manufactured carbon dioxide as an alternate means of temporarily dissolving carbon dioxide in the saline water.

Having reference now to the drawing, the principal units of the apparatus comprise surface heat exchanger 10, multistage flash evaporator 11, surface heat exchange evaporator 13, typically a thermocompression or multiple-effect evaporator, and thermoprecipitator 12. Each of these units is known to the art except said thermoprecipitator, one form of which, however, is described in said copending patent application. It is sufficiently characterized for purpose of the present invention by noting that heated saline water is further heated therein and carbon dioxide evolved while scale compounds are precipitated and separated saline water or brine is formed.

Turning now to a recital of the method of operation and referring to FIG. 1, sea water entering in saline water conduit 18 is preferably first freed of air in deaerator 17 situated on said conduit. At junction 14 in conduit 18, anterior to the inlet of feed pump 20 and subsequent to deaerator 17, the sea water having been deaerated is now combined with carbon dioxide entering from conduit 22. The source of the carbon dioxide is that evolved from multistage flash evaporator 11 into conduit 25, whence it is recovered as collected carbon dioxide at collection point 19 and transmitted to the saline water, generally only in part by division at said collection point, through said conduit 22, while another substantially like but generally unequal part is discharged as excess through conduit 26.

Combined now with transmitted carbon dioxide which is dissolved in it, the sea water is delivered by feed pump 20 to heat exchanger 10 through conduit 21. In said heat exchanger, which is depicted separately but in practice is incorporated in said multistage flash evaporator 11, it is heated without scale formation on the heat transfer surfaces to the uppermost temperature of the multistage flash evaporator. The heating medium will be steam or vapor entering from conduit 15 and leaving as condensate through conduit 16.

The heated sea water passes from heat exchanger 10 into conduit 24 to said multistage flash evaporator 11, where it is converted to fresh water distillate and brine concentrate, the latter containing in suspension alkaline scale-forming compounds precipitated in the evaporator, while carbon dioxide, comprising that which had been originally added from conduit 22 and that produced in multistage flash evaporator 11 by the concurrent thermal decomposition of bicarbonate in the saline water, is evolved into conduit 25 as aforesaid.

Referring now to FIG. 2, from conduit 18 sea water to be deaerated enters indirect preheater 31 where its temperature is raised short of that resulting in scale-formation on the heat transfer surfaces of the preheater. The heating medium may be the effluent of that for heat exchanger 10, entering preheater 31 from conduit 16 and issuing in conduit 16'. Preheater 31, as described with reference to FIG. 2, is likewise applicable to the apparatus of FIG. 1.

The preheated sea water in conduit 18 now passes into deaerator 17, where in view of its elevated temperature it is more effectively deprived of its air content.

The sequence of steps after deaerator 17 is as described in connection with FIG. 1 to the point where the heated sea water passes into conduit 24. From here it now enters thermoprecipitator 12 where scale-forming solids are precipitated and settled and carbon dioxide is evolved into conduit 25, while brine issues in conduit 28. From the latter it passes into surface heat exchange evaporator 13 where it is converted scale-free into fresh water distillate and brine concentrate.

The carbon dioxide evolved from thermoprecipitator 12 into conduit 25, comprising as before previously added carbon dioxide and that formed in said thermoprecipitator from the saline water by concurrent thermal bicarbonate decomposition, is recovered as collected carbon dioxide at collection point 19 and transmitted, generally in part, through conduit 22 to the sea water in conduit 18. The transmittal of carbon dioxide occurs at junction 14 situated as previously subsequent to deaerator 17 and anterior to the inlet of feed pump 20.

A comparison of FIGS. 1 and 2 and the related discussion shows that the apparatus of each is similar in the basic steps of dissolving, evolving and transmitting recovered carbon dioxide, the difference being in the particular modes of evolving carbon dioxide and of evaporating saline water which had been heated scale-free.

Sulfuric acid or other strong acid may be employed temporarily, pending the recovery and transmittal of carbon dioxide, to initiate the formation of carbon dioxide and its solution in the saline water, for example by delivery from acid container 29 and conduit 30 to the saline water at junction 32 in conduit 18, said junction being situated similarly to its counterpart junction 14. Thereafter, the acid will generally be discontinued, for it represents an expense item while the similarly functioning transmitted carbon dioxide is freely available from the saline water.

The collected carbon dioxide is indeed available in unlimited quantity for addition to the saline water, in view of the recirculation of said addition together with that of continuous new formation from the saline water bicarbonate decomposition as aforesaid.

The proportion relative to saline water of dissolved carbon dioxide required to prevent scale deposition in heat exchanger 10 depends not only on the temperature, but also on the bicarbonate and calcium and magnesium content of the saline water. It is not necessary in practice to pinpoint the required addition. An excess of carbon dioxide is permissible and provides flexibility and certitude, while also feasible in view of its unlimited availability, as aforesaid. On the other hand, an excess is undesired in view of the resultant increase in carbon dioxide acidity.

In the instance specifically of sea water, the minimum dosage of carbon dioxide in p.p.m. (parts per million) for preventing scale formation in heat exchanger 10 is given in Table 1 as a function of temperature of the sea water. Also given is the resultant pH of the sea water measured at 77° F.

TABLE 1

| Temperature, °F | 212 | 257 | 302 |
|---|---|---|---|
| ppm Carbon Dioxide | 40 | 55 | 215 |
| pH | 6.6 | 6.4 | 5.8 |

The required content of dissolved carbon dioxide for scale prevention in heating increases with temperature thereof, slowly between 212° F. and 257° F. and rapidly thereabove. It may be noted that although the bicarbonate and carbonate equivalent of carbon dioxide in sea water is 100 p.p.m., an addition of 215 p.p.m. at 302° F. as indicated in Table 1 is attainable in view, as said of the unlimited availability of collected carbon dioxide.

In multistage flash evaporation, the heating temperature of the sea water will not exceed 250° F., and similarly for the temperature of heating in regard to thermoprecipitator 12. Up to this temperature a transmission of carbon dioxide in excess of about 55 p.p.m. is unnecessary.

It is recognized that a sea water pH in the presence of dissolved carbon dioxide of 6.4 to 6.6, as shown in Table 1 for temperatures between 212° F. and 257° F., is conducive to corrosion in heat exchanger 10. Other factors contributing to corrosion are the chloride content of saline water and the dissolved oxygen therein. Provision in the invention for the effective elimination of oxygen, by preliminary deaeration as set forth, will tend to offset the effect of pH. The removal of air also simplifies the recovery and reuse of evolved carbon dioxide.

Acting on introduced saline water, deaerator 17 comprises a vacuum deaerator. The rate of evacuation is considerably increased by first heating the saline water in preheater 31. Complete deaeration of the saline water is attainable. Maintenance of a very high vacuum is required, which is relatively expensive. In ordinary operation, a residual of 0.25 to 0.75 p.p.m. air will occur in the saline water issuing from the deaerator.

A deaerator residual, being gaseous, is completely evolved with the carbon dioxide, which for precision is now to be considered as including any carbon dioxide, however small, which may be present in the air residual. In view of the relatively great volume of collected carbon dioxide, the content of residual in the collected carbon dioxide will be very small, while its presence is continuously decreased by the loss of residual to carbon dioxide that is discharged. As a result, residual recirculated to the saline water is minimal, and its content in the saline water, even after prolonged operation, is more than that present immediately after deaeration.

For example, in the instance of sea water the air residual immediately after deaeration being an average of 0.50 p.p.m. and the evolved carbon dioxide being 100 p.p.m., the content of air residual in the collected carbon dioxide is only 0.50 parts per 100. Assuming a preheating temperature as high as 257° F., the recirculated carbon dioxide required to prevent scale formation is, by Table 1, 55 p.p.m. The air residual in the collected carbon dioxide recirculated to the sea water is, therefore, $(55/100)\times 0.5$, or 0.28 p.p.m.

Adding the 0.28 p.p.m. to the air residual of 0.50 p.p.m. remaining after deaeration gives an air residual retained by the sea water of 0.78 p.p.m. along with the 55 p.p.m. carbon dioxide recirculated to it. So long as 55 p.p.m. carbon dioxide continues to be recirculated, the air residual retained by the receiving sea water remains constant, i.e. is nonaccumulating as said, at 0.78 p.p.m.

Under this circumstance of comparative accumulation in recirculation, the residual of air would be of no consequence were it not for the content therein of oxygen. The corrosivity of oxygen is increased in the presence of carbon dioxide, while conversely that of carbon dioxide is greatly diminished by the complete absence of oxygen.

Figure 4:
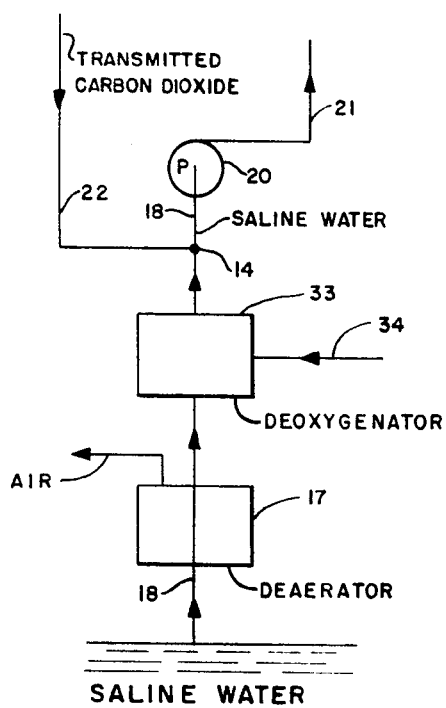
FIG. 4 is a fragmentary diagram illustrating the elimination of oxidant residuals from deaerated saline water.
Figure 5:
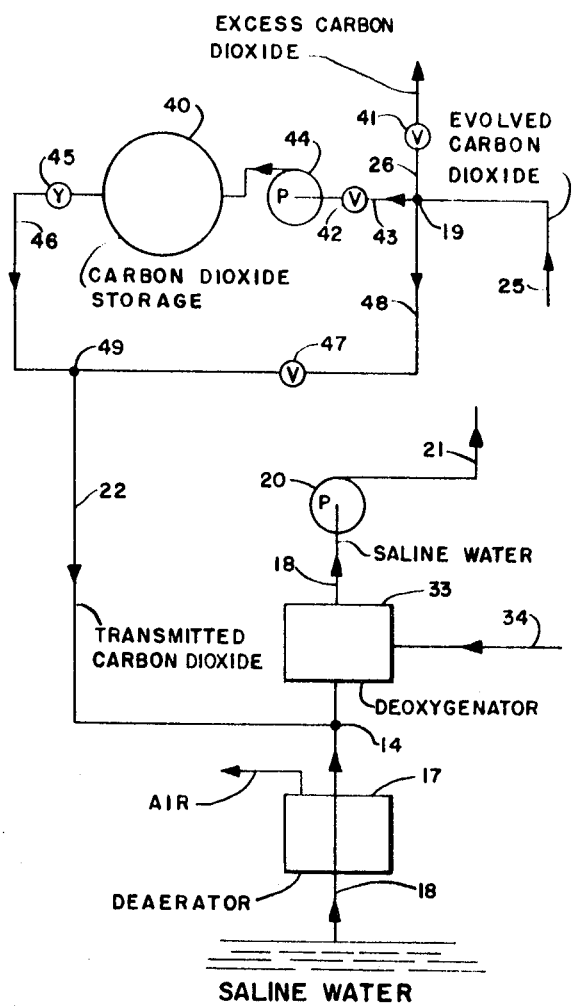
FIG. 5 is a fragmentary diagram illustrating the elimination alternately of oxidant residuals, and the recovery of evolved carbon dioxide for storage thereof.

In order to eliminate oxygen residual after ordinary vacuum deaeration, a deoxygenating agent is added to the deaerated saline water. The addition is made alternately before transmission of recovered carbon dioxide, as shown in FIG. 4, or after the transmission as shown in FIG. 5, the corresponding deoxygenation taking place respectively at a slightly alkaline pH or acid pH. Omitting the factor of pH from consideration, the addition of deoxygenating agent after transmission has the advantage that oxygen, which in one way or another may have gotten into the collected carbon dioxide, is removable by the agent.

In processing according to FIG. 4, deaerated saline water in conduit 18 enters deoxygenator 33, which comprises a closed chamber into which a deoxygenating agent is introduced through conduit 34 and combined with the saline water therein. The rate of reaction with oxygen residual is influenced by the nature of the agent, its concentration and the pH and temperature of the saline water. It is markedly accelerated by the saline water having first been heated in preheater 31.

After issuing from deoxygenator 33, with oxygen and traces of any other oxidant such as chlorine removed, the saline water receives transmitted carbon dioxide at junction 14, and thereupon passes to feed pump 20 and conduit 21 as aforesaid.

In processing according to FIG. 5, the deaerated saline water alternately receives transmitted carbon dioxide first, at junction 14, and thereupon enters deoxygenator 33, in which while retaining dissolved carbon dioxide it receives deoxygenating agent through said conduit 34.

The deoxygenating agent which, may be any suitable compound, is selected chiefly from among sodium sulfite; sodium sulfite catalyzed by about one-fourth percent of one or more cations, including copper, cobalt, nickel, manganese and iron; sodium phosphite; hydrazine; ferrous sulfate and ferrous hydroxide. The ferrous hydroxide may be chemically prepared, or generated in situ in chamber 33 electrolytically from iron plates, in accordance, for example, with U.S. Pat. No. 3,294,665 and others issued to the applicant. Of the above, sodium sulfite with or without catalyst or ferrous compound is generally preferred.

The oxygen residual after deaeration will vary from about 0.10 to 0.25 p.p.m. $O_2$. The rate of deoxygenation of this residual by sodium sulfite is exceptionally rapid in the instance of sea water. Employing an excess of 100 percent, about 2.5 lbs. of sodium sulfite is required per million lbs. of sea water.

The time of retention of the saline water in chamber 33 varies with deoxygenating and other conditions and will range from about 30 seconds to 10 minutes.

Having eliminated the oxygen residual, an inert gas residual, comprising chiefly nitrogen, will remain in the deaerated saline water. The concentration is about 0.15 to 0.40 p.p.m. as $N_2$, and this will only slightly increase even after prolonged recirculation of collected carbon dioxide, as explained with respect to an air residual. The effect of an inert gas residual would be to impede heat transfer in heat exchanger 10. Since quantities are required several orders of magnitude greater than that of the inert gas residual in the saline water, the presence of this residual after ordinary deaeration and even prolonged recirculation is of little consequence.

If, one way or another, air should get into the apparatus or the oxygen-free residual become excessive and contaminate the collected carbon dioxide, either or both may be eliminated by ceasing transmission of collected carbon dioxide while alternately adding an acidic substance to the saline water to form fresh evolved carbon dioxide, and employing this to flush that which had become contaminated, through discharge conduit 26. When the air contaminant will have become displaced, the addition of acidic substance is discontinued and the regular transmission of collected carbon dioxide resumed.

Acidic substance comprises a strong acid or carbon dioxide, either manufactured or recovered from collected carbon dioxide as will be explained. Manufactured carbon dioxide, provided as compressed, liquefied or frozen gas, as shown in FIG. 6 may be delivered as temporarily required acidic substance from container 37 and conduit 36 to the saline water at junction 38 in conduit 18, said junction being situated on conduit 18 similarly to counterpart junction 14 in FIG. 4 or 5.

As an alternate to manufactured carbon dioxide, a portion of the collected carbon dioxide may be stored, as illustrated in FIG. 5. To this end, with valves 41 and 45 closed and valve 42 open, collected carbon dioxide is shunted from discharge conduit 26 to conduit 43, gas compressor 44 and finally carbon dioxide storage vessel 40. When the latter has been filled, the normal passage of carbon dioxide through discharge conduit 26 is resumed, by closing valve 42 and opening valve 41.

If collected carbon dioxide becomes contaminated and is temporarily not to be transmitted to the saline water, stored carbon dioxide may be alternately employed by closing valve 47 and opening valve 45, whereupon the stored gas passes to junction 14 on saline water conduit 18 by way of conduit 46, junction 49 and conduit 22. After flushing, the stored carbon dioxide passage is suspended and the transmission of collected carbon dioxide resumed by opening valve 47 and closing valve 45.

Alternately to discharging carbon dioxide through conduit 26, it may be diverted in the manner described and stored in an enlarged storage vessel 40 for extended recovery of carbon dioxide as a byproduct of the process.

The quantity of sulfuric acid temporarily added to saline water to prevent alkaline scale in heat exchanger 10 is given in Table 2 as a parallel to Table 1 for carbon dioxide.

TABLE 2

| Temperature, °F | 212 | 257 | 302 |
|---|---|---|---|
| ppm $H_2SO_4$ | 25 | 35 | 75 |
| pH | 6.7 | 6.5 | 5.8 |

As in the case of carbon dioxide, the sulfuric acid requirement increases with temperature of the heated saline water, slowly to about 257° F. and rapidly thereafter. It is not only but initiatory, but only about one-fourth that continuously employed in current multistage flash evaporation practice.

The pH after the sulfuric acid addition is 0.1 greater than for carbon dioxide at the same temperature. The indicated greater alkalinity results from the acid reducing bicarbonate ion, as well as forming carbon dioxide.

Noteworthy merits of the invention include the substantial economy effected by avoiding the continuous addition of acid to prevent alkaline scale in saline water heating, and the counteraction of carbon dioxide corrosivity by providing for the elimination of oxygen residual in the saline water. Having thus described my invention, it will be recognized that adaptations of the method and apparatus may be made which will fall within the terms and scope of the invention as claimed.

What I claim is:

1. A process for converting saline water containing alkaline bicarbonates and carbonates to fresh water and brine, which comprises deaerating the saline water leaving a residual of air; indirectly preheating the deaerated saline water; evolving from the preheated saline water carbon dioxide, including that formed by the thermal decomposition of alkaline bicarbonates and carbonates, and air residual; recovering evolved carbon dioxide and air residual to include its carbon dioxide as collected carbon dioxide; recirculating to the saline water as the sole required carbon dioxide, said collected carbon dioxide, with retention thereof, including its air residual, by the saline water, in proportion to the latter as required to prevent alkaline scale formation in the preheating thereof; and evaporating the preheated saline water in the course of or subsequent to evolving carbon dioxide to produce fresh water and brine.

2. Claim 1 wherein the saline water is preheated before deaeration.

3. Claim 1 wherein the carbon dioxide is evolved from the indirectly heated saline water while evaporating the saline water in a multistage flash evaporator to produce fresh water and brine.

4. Claim 1 wherein the carbon dioxide is evolved from the indirectly heated saline water by further heating it while precipitating scale-forming compounds; and the further heated saline water is evaporated in a surface heat exchange evaporator to produce fresh water and brine.

5. Claim 1 wherein a strong acid is added to the saline water to form dissolved carbon dioxide therein and initiate the evolved carbon dioxide: and thereafter discontinuing the addition of strong acid while normally recirculating evolved carbon dioxide to the saline water.

6. Claim 1 wherein the saline water is sea water and the carbon dioxide is added in substantially the minimum amount required to prevent the formation of scale during indirect heating of the sea water, the minimum amount of carbon dioxide increasing with the temperature of indirect heating and in parts per million of sea water being representatively 40 at 212° F., 55 at 257° F. and 215 at 302° F.

7. A process for converting saline water containing alkaline bicarbonates and carbonates to fresh water and brine, which comprises deaerating the saline water leaving a residual of air;

adding a deoxygenating agent to the deaerated saline water and converting the air residual into an oxygen-free residual; indirectly preheating the deaerated saline water containing oxygen-free residual; evolving from the preheated saline water carbon dioxide, including that formed by the thermal decomposition of alkaline bicarbonates and carbonates, and oxygen-free residual; recovering evolved carbon dioxide and oxygen-free residual to include its carbon dioxide as collected carbon dioxide; recirculating to the saline water as the sole required carbon dioxide, said collected carbon dioxide, with retention thereof, including its oxygen-free residual, by the saline water, in proportion to the latter as required to prevent alkaline scale formation in the preheating thereof; and evaporating the preheated saline water in the course of or subsequent to evolving carbon dioxide to produce fresh water and brine.

8. Claim 7 wherein the deoxygenatiang agent is selected from among sodium sulfite, catalyzed sodium sulfite, ferrous sulfite and ferrous hydroxide.

9. Claim 7 wherein an acidic substance, selected from among a strong acid and carbon dioxide, is added to the saline water to form dissolved carbon dioxide therein and initiate the evolved carbon dioxide with included oxygen-free, gas residual; and discontinuing the addition of acidic substance while normally recirculating evolved carbon dioxide with included oxygen-free, gas residual to the saline water.

10. Claim 7 wherein collected carbon dioxide with included oxygen-free, gas residual is stored for any required use or as a byproduct of the process.

11. Claim 7 wherein the saline water is sea water; sulfuric acid is added initially to form dissolved carbon dioxide therein in substantially the minimum amount required to prevent scale formation during the indirect heating, the minimum amount of sulfuric acid increasing with the temperature of indirect heating and in parts per million of sea water being representatively 25 at 212° F., 35 at 257° F. and 75 at 302° F.; and discontinuing the addition of sulfuric acid while normally recirculating evolved carbon dioxide with included oxygen-free residual to the sea water.

12. Claim 7 wherein the recirculation of collected carbon dioxide is discontinued while an acidic substance, selected from among a strong acid and carbon dioxide, is added to the saline water forming carbon dioxide therein; evolving the formed carbon dioxide and flushing collected carbon dioxide with it, whereby contaminants including excess included oxygen-residual are displaced from the collected carbon dioxide; and discontinuing the addition of acidic substance while resuming the recirculation of collected carbon dioxide with normally included oxygen-free, gas residual.

UNITED STATES PATENT OFFICE
CERTIFICATE OF CORRECTION

Patent No. 3,607,666                     Dated Sept. 21, 1971

Inventor(s) Paul S. Roller

It is certified that error appears in the above-identified patent and that said Letters Patent are hereby corrected as shown below:

In column 4, line 24: after "dioxide," insert --comprising newly evolved as well as previously recirculated carbon dioxide,-- line 27: after "result," insert --deaeration-- line 28: after "its" insert --accumulating-- line 29: after "is" insert --not much-- line 47: to "comparative" add the suffix --ly-- and after this insert the word --low--

Signed and sealed this 25th day of July 1972.

(SEAL)
Attest:

EDWARD M. FLETCHER, JR.          ROBERT GOTTSCHALK
Attesting Officer                Commissioner of Patents